May 31, 1960 P. W. JOHNSON 2,938,273
GAGE FOR A TURBINE BLADE WEDGE AND THE LIKE
Filed Aug. 28, 1956 2 Sheets-Sheet 1
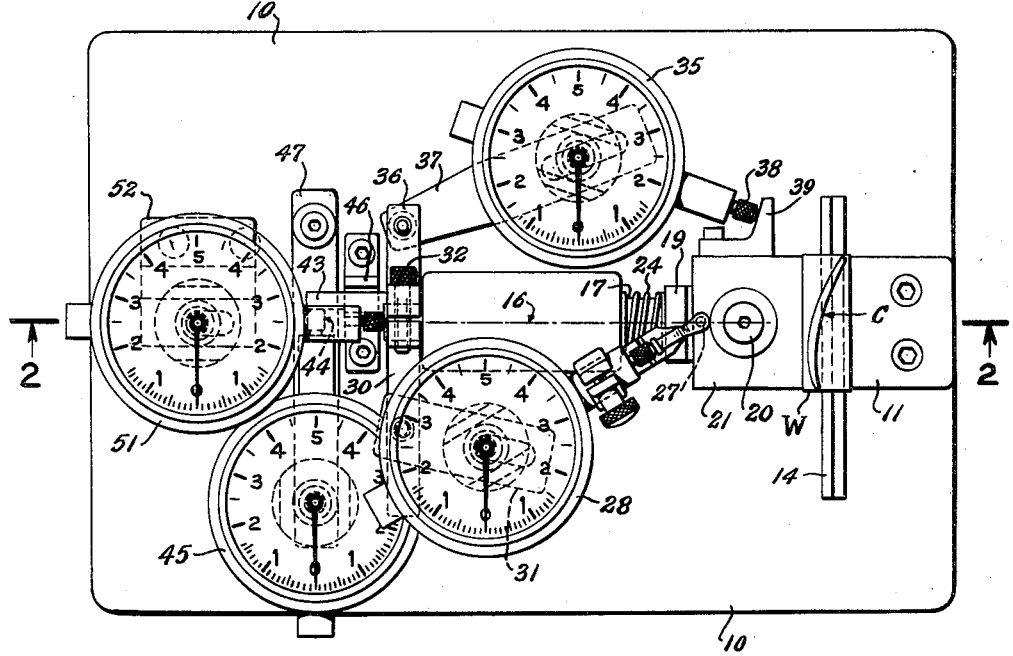
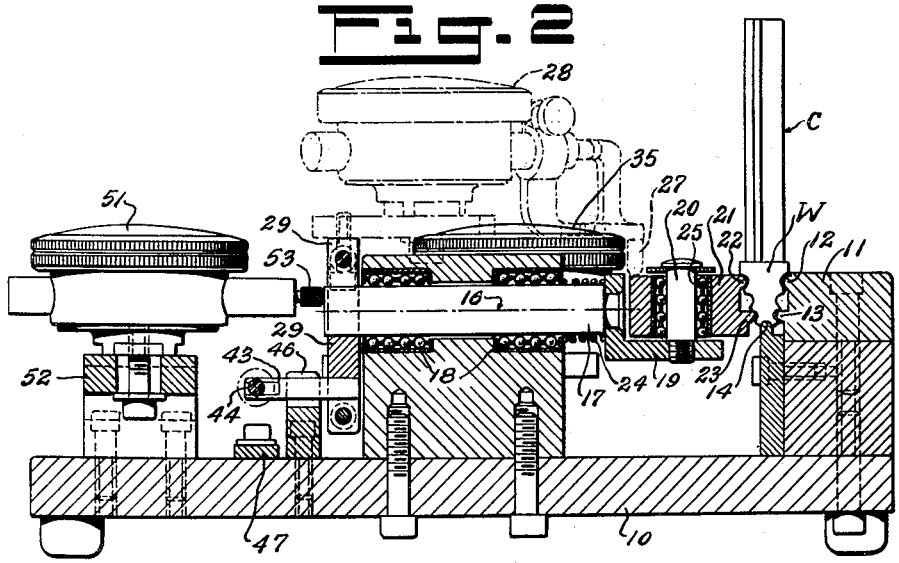
INVENTOR.
PAUL W. JOHNSON
BY
Bohleber, Fassett & Montstream
ATTORNEYS

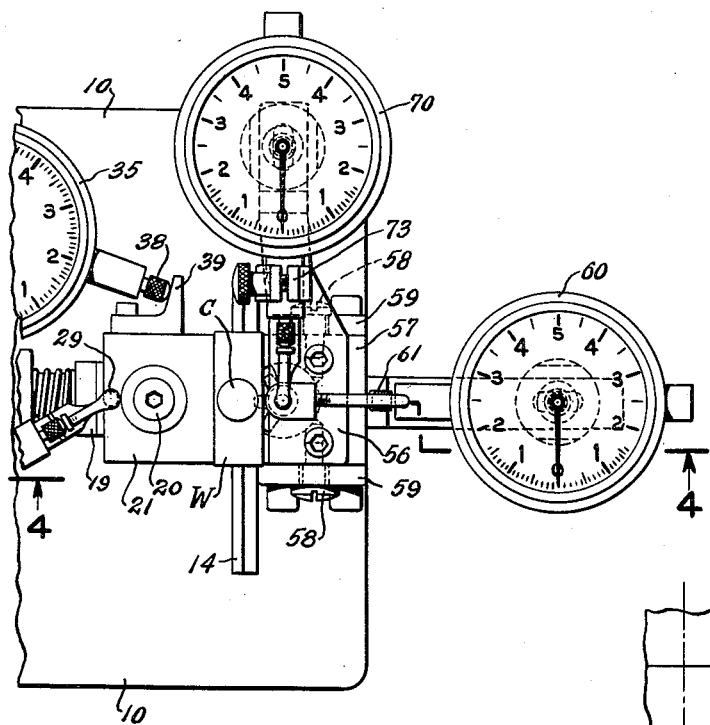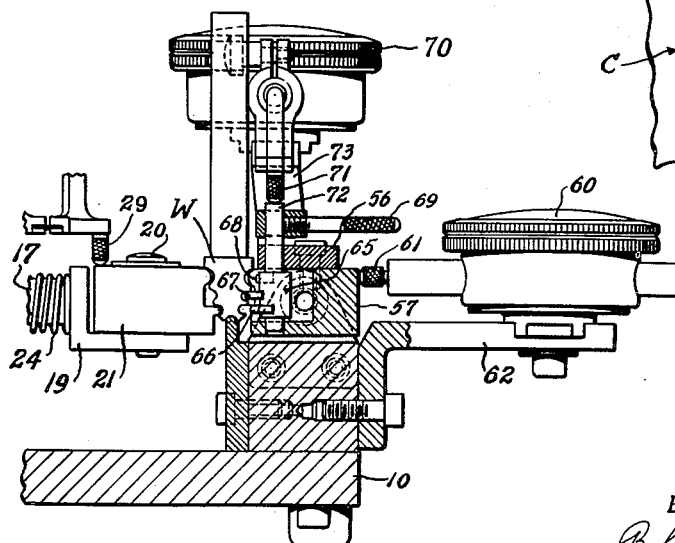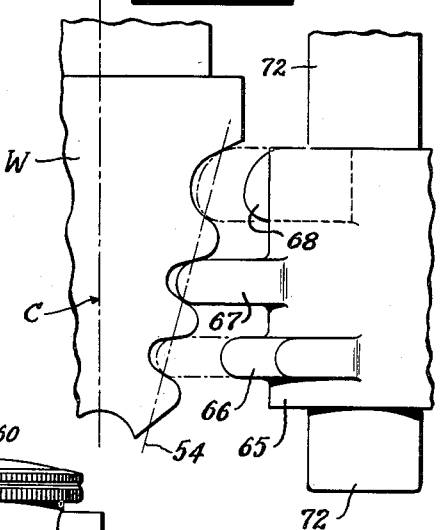

United States Patent Office 2,938,273
Patented May 31, 1960

2,938,273

GAGE FOR A TURBINE BLADE WEDGE AND THE LIKE

Paul W. Johnson, Bloomfield, Conn., assignor to The Johnson Gage Development Company, Bloomfield, Conn., a corporation of Connecticut Filed Aug. 28, 1956, Ser. No. 606,699

23 Claims. (Cl. 33—174)

The invention is directed to a gage for testing particularly the anchoring wedge of a turbine blade. The wedge includes locking means in the form of at least one groove or ridge on at least one face thereof; however, for a blade on the rotor the wedge usually has three locking means on each side or face of the wedge. These grooves or ridges are parallel to each other but the wedge tapers so that it becomes narrower at the bottom or end of the wedge. In order to assure that the blade assumes the proper position on the turbine wheel or on the turbine stator and that it is adequately held to resist the various forces on the blade, the locking means are gaged as to their accuracy in at least two of four different characteristics or elements thereof, and usually in all four characteristics. In a more advanced form of gage six different characteristics or elements of the wedge are tested or gaged.

It is an object of the invention to construct a gage for testing the locking means of a wedge such as for a turbine blade as to four elements or characteristics thereof.

Another object is to construct a gage for testing the locking means on one side or face of a wedge for planar alignment with respect to the locking means on the other side or face of the wedge.

A still further object is to construct a gage which tests as in the preceding paragraph but also tests for one or two other characteristics or elements of the locking means of the wedge.

Other objects of the invention will be more apparent from the following description when taken in connection with the accompanying drawings illustrating two preferred embodiments thereof in which:

Fig. 1 is a plan view of the gage;

Fig. 2 is a section through the gage taken on line 2—2 of Fig. 1;

Fig. 3 shows the cooperating anvil of the gage as being pivoted and carries a lead testing means;

Fig. 4 is a vertical section taken on line 4—4 of Fig. 3; and

Fig. 5 is an enlarged view of the lead testing means for the groove or ridge means.

The gage includes a base 10 which includes any pedestal secured thereto there being two affixed on a base plate. The base in the simpler form of gage carries a fixed or cooperating anvil 11 having a plurality of spaced ridge means 12 and 13 which preferably engage in the grooves on one face of a turbine wedge W. The ridge means may be of such form as to receive the ridge portion of the locking means on the wedge. The blade and wedge has a central axis C. Preferably, too, the base carries a slide 14 which engages the bottom of the wedge so that it can be slid conveniently into gaging position between the fixed anvil and another anvil as will appear.

The base carries a spindle or shaft 17 which is mounted in bearings 18 so that it pivots as well as being movable axially in the direction of its central axis 16 or towards and away from the cooperating anvil. A first anvil 21 having at least one ridge means on the end face thereof and particularly shows two spaced ridge means 22 and 23 for engaging the upper and lower locking grooves of the wedge. This anvil is mounted on the shaft so that it may move or adjust itself laterally to engage the locking means of the wedge. Preferably too it is pivotally mounted as will appear. These movements are accomplished by providing on the end of the spindle or shaft, a frame 19 which has a pivot means or pin 20 extending at right angles to the central axis of the shaft 17 and therefore extending at right angles to the movement of the anvil towards and away from the wedge in gaging position. The pivot pin extends in a direction laterally with respect to the ridge means on the first anvil. A spring 24 presses the shaft 17 and the pivoted anvil 21 towards the wedge W, or towards the cooperating anvil 11. Gaging position is then the space between the anvil 21 and the anvil 11.

It has been mentioned that the anvil 21 is mounted for lateral or vertical movement or towards and away from alignment with respect to the cooperating anvil or the ridge means on the anvil 11. The movement may be described also as being axially of the pivot 20. This lateral movement for a pivoted anvil may be accomplished by providing sufficient clearance so that the anvil may move axially on the pivot pin 20. Any lateral movement will indicate any misalignment between the locking means on one face of the wedge with respect to the locking means on the other face. This lateral or vertical movement of the pivoted anvil on its pivot is indicated by an indicator 28 which has a contactor 27 engaging the face of the pivoted anvil 21 preferably at its lateral center corresponding with or over the shaft axis 16 in order to assure that it will be uninfluenced by any other movement of the anvil other than the lateral movement on the pivot pin 20. This indicator should rotate with the shaft 17 so that it will not be influenced by any movement of the anvil with respect to turning of the shaft. To this end a bracket 29 is suitably fastened to the shaft such as by a screw 32 so that it turns and moves axially therewith. This bracket carries an arm 30 and the indicator 28 is secured to the arm in any suitable manner such as by the plate 31.

The pivoting of the pivoted anvil 21 will enable the anvil to adjust itself to any longitudinal taper in the wedge that is taper in the direction of the ridge means or the locking means. Pivoting of the anvil 21 by turning of the shaft 17 in its bearings 18 will enable the anvil to adjust itself to any taper or angularity of the locking means on the wedge with respect to a plane perpendicular to the central axis of the blade and wedge. The movement of the pivoted anvil 21 toward and away from the cooperating anvil 11 by axial movement of the shaft will indicate the thickness of the wedge.

An indicator is provided to indicate the extent of any pivotal movement of the pivoted anvil 21 on the pivot pin 20. This movement is indicated by an indicator 35. In order to have this indicator respond solely to the pivotal action on the pin 20 this indicator is carried on the bracket 29 by being fastened to an arm 36 carried by the bracket which arm carries a plate 37 to which the indicator 35 is fastened. This indicator, therefore, moves with the pivotal and axial movement of the shaft 17 and will be uninfluenced by these two movements. The contactor 38 engages the anvil or particularly an angle member 39 carried thereby at a point spaced from the pivot 20. Any pivotal movement of the pivoted anvil 21 on the pivot 20 will move the contactor 38 of the indicator 35 so that the pivotal movement will be indicated on the indicator. Any reading on the indicator 35 will be occasioned therefore by any longitudinal taper of the locking means of the wedge W in a horizontal plane or a plane corresponding with the locking means on opposite faces of the wedge.

If the locking means on one side of the test wedge should deviate angularly with respect to those on the other side of the wedge, that is would deviate from a plane at right angles with respect to the axis C of the test blade or wedge, this deviation would result in pivoting of the anvil 21 with respect to the cooperating anvil or base, the pivoting taking place by the shaft pivoting. This pivoting would be indicated by swinging of the bracket 29. The bracket 29 preferably carries a stop pin 43 and a contactor 44 of an indicator 45 engages the stop pin to measure or indicate any pivotal movement of the anvil 21 and the shaft 17. Preferably the stop pin 43 passes between a pair of spaced projections 46 which are secured to the base in order to limit pivoting of the shaft 17. The indicator 45 is suitably mounted on the base such as by being carried on a plate 47 which is secured to the base.

Means are also provided to indicate the extent of axial movement of the shaft 17. This means includes an indicator 51 suitably mounted on the base such as by a plate or bracket 52. This indicator has a contact 53 which engages the end of the shaft 17 so that any axial movement thereof occasioned by variation of thickness of the test wedge from a perfect thickness will appear on this indicator.

Means is provided by the gage for mounting the first anvil for movement in any one or more of three ways namely first pivoting on a first axis 16, second axial movement on this axis or towards and away from the cooperating gaging means and third, pivoting on a second axis extending at right angles to the axis 16 and to the ridge means provided by the pivot means 20. Any one of these movements is provided in combination with movement of the anvil laterally with respect to the ridge means on the anvil or in a direction axially with respect to the pivot means 20.

It will be observed, therefore, that the gage described will test a turbine blade wedge or the locking means thereof with respect to four essential elements of the locking means, namely with respect to taper in two directions, with respect to misalignment between locking means on opposite faces of the wedge and with respect to the thickness of the wedge. The locking means of the wedge may be described as being straight threads in that they are not helix as in a circular thread. The contact of the ridge means 22 and 23 as well as 12 and 13 are on what may be termed a pitch line 54 extending centrally or approximately centrally through the ridge means of the test wedge W.

Means are provided to test a wedge for taper in a third direction and for pitch variation or spacing between locking means as shown in Figs. 3, 4, and 5. A cooperating anvil 57 for the test wedge W is provided which instead of being fixed as in Figs. 1 and 2 is mounted for pivotal movement on a longitudinal axis. The anvil includes a plate 56. The cooperating anvil in this construction is mounted for pivotal movement on a horizontal pivot means formed by pins 58 each secured to one of the spaced flanges 59 carried by the base 10 and entering holes in the sides of the anvil. Any tilting or pivoting of the cooperating anvil 57 will indicate a taper of the wedge with respect to the central axis C of the wedge which varies from the taper of a perfect wedge. The pivoting of the cooperating anvil 57 will be indicated by an indicator 60, the contactor 61 of which engages a face of the cooperating anvil at a point spaced from the pivots 58. A bracket 62 secured to the base supports the indicator. In this construction, therefore, a fifth characteristic or element of the test part is gaged which is a test for taper axially of the wedge.

Preferably means are provided for indicating the lead or spacing of the locking means of the anchoring wedge. This lead testing means may be carried by either anvil, however, it is shown carried by the cooperating anvil 57. This lead testing means 65 is mounted at the center of the anvil for rotation on a vertical axis or on a lateral axis with respect to the gage means or an axis parallel to the axis of the test wedge W. This axis is provided by an axle 72 which is received in holes in the anvil. The lead testing means is mounted also for free movement axially or vertically downwardly and upwardly. The lead testing means carries a plurality of ridge means on its periphery and it is desirable to test the spacing or lead between each groove in the face of the wedge, although a test of the spacing between the upper and lower grooves provides valuable information. Since three such grooves are shown there are three ridge means 66, 67 and 68. These ridge means are staggered peripherally with respect to each other and are staggered axially so that each ridge means individually engages its respective groove in the face of the wedge. A handle 69 is secured to the axle for turning the lead testing means. Any axial movement of this means will be indicated by an indicator 70 having a contactor 71 engaging any portion of the lead testing means so that it is controlled or responsive to any axial movement thereof. In the construction particularly illustrated, the contactor 71 engages the end of the axle 72 for the lead testing means. The indicator 70 is carried upon a suitable bracket 73 mounted on or secured to the anvil 57 so that the contactor of this indicator is not influenced by any pivotal movement of the anvil.

If the spacing between grooves differs from that of perfectly spaced grooves of a wedge, the ridge means such as 56 when it engages the groove will shift the lead testing means axially, which movement will be indicated on the indicator 70. Likewise, if any of the other grooves are improperly located or spaced, the lead testing means will be shifted axially upon the ridge means 67 and 68 being brought into engagement with its respective groove.

It will be noted then that the gage with the additions shown in Figs. 3–5 will gage or test the lead or spacing between the locking means on the wedge as well as a third direction of taper in the wedge. The construction or mounting means, by which any one or both tests given by the cooperating anvil of Figs. 3–5 provides a new combination of structure with one or more features of the structure of the first anvil by which is secured a test for longitudinal taper, horizontal or planar taper, relative planar position and wedge thickness any one or more of the elements of the wedge which can be tested for with the first anvil.

The anvils illustrated show ridge means of a form which engage in a groove in the wedge and hence contact opposite surfaces of the grooves. It is clear that the ridge means may be of a form to engage opposite surfaces of one or more longitudinally extending ridges. The blade or wedge may be tested in one position, removed and turned around and again tested with the other face of the wedge engaging the cooperating anvil.

The mounting mechanism for the anvil 21 mounts this anvil for any one or more of the four movements described. Particularly the mounting mechanism has at least one of two mounting means, one mounting means being the shaft 17 having at least one of two movements as described and the other mounting means being the pivot 20 having at least one of two movements as described.

This invention is presented to fill a need for improvements in a gage for a turbine blade wedge. It is understood that various modifications in structure, as well as changes in mode of operating, assembly, and manner of use, may and often do occur to those skilled in the art, especially after benefitting from the teaching of an invention. Hence, it will be understood that this disclosure is illustrative of preferred means of embodying the invention is useful form by explaining the construction, operation and advantages thereof.

What is claimed is:

1. A gage for testing a test part such as a turbine blade wedge having locking means comprising a base, a first anvil having at least one straight ridge means for engagement of a substantial length of the locking means on one face of a wedge, means carried on the base for mounting the anvil for two movements including pivotal movement upon a first axis extending at right angles to the ridge means and axial movement upon this axis, an indicator for each movement and controlled by the movement, means mounting the anvil for lateral movement at right angles to the first axis and laterally with respect to its ridge means, an indicator controlled by the said lateral movement of the anvil, and a cooperating anvil carried by the base in alignment with the first anvil between which a test part is received in gaging position.

2. A gage for testing a test part such as a turbine blade wedge having locking means comprising a base, a first anvil having at least one straight ridge means for engagement of a substantial length of the locking means on one face of a wedge, a first mounting means carried on the base for mounting the anvil for pivotal movement upon a first axis extending at right angles to the ridge means, an indicator carried by the base to indicate the pivotal movement, a second mounting means carried by the first mounting means mounting the anvil for pivotal movement and lateral movement on a second axis extending at right angles to the first axis, and also extending laterally with respect to the ridge means, an indicator carried by the first mounting means and controlled by the pivotal movement on the second mounting means, an indicator carried by the first mounting means and controlled by the said lateral movement of the anvil, and a cooperating anvil carried by the base in alignment with the first anvil between which a test part is received in gaging position.

3. A gage for testing a test part such as a turbine blade wedge having locking means comprising a base, a first anvil having at least one straight ridge means for engagement of a substantial length of the locking means on one face of a wedge, a cooperating anvil carried by the base in alignment with the first anvil and having at least one straight ridge means, means carried on the base for mounting the first anvil for two movements including movement towards and away from the cooperating anvil and pivotal movement on an axis extending at right angles to the aforesaid movement and also extending laterally with respect to the ridge means, an indicator for each movement and controlled by the movement, means mounting the first anvil for lateral movement on its pivotal axis which is at right angles to the movement towards and from the cooperating anvil and laterally with respect to its ridge means, and an indicator controlled by the said lateral movement of the anvil, a test part being received between the anvils in gaging position.

4. A gage for testing a test part such as a turbine blade wedge having locking means comprising a base, a first anvil having at least one straight ridge means for engagement of a substantial length of the locking means on one face of a wedge, means carried on the base for mounting the anvil for three movements including pivotal movement upon a first axis extending at right angles to the ridge means and axial movement upon this axis and pivotal movement on a second axis extending at right angles to the first axis and also extending laterally with respect to the ridge means, an indicator for each movement and controlled by the movement, means mounting the first anvil for axial movement on its axis and laterally with respect to its ridge means, an indicator controlled by the said lateral movement of the anvil, and a cooperating anvil carried by the base in alignment with the first anvil and having at least one ridge means between which anvils a test part is received in gaging position.

5. A gage for testing a test part such as a turbine blade wedge having locking means comprising a base, a first anvil having at least one straight ridge means for engagement of a substantial length of locking means in one face of a wedge, a shaft mounted on the base having a first axis extending at right angles to the ridge means and having at least one movement including pivotal movement upon the first axis and axial movement, an indicator carried by the base for each movement of the shaft, means carried by the shaft mounting the first anvil thereon for movement laterally with respect to the ridge means, an indicator carried by the shaft having a contactor engaging the anvil to be controlled by the said lateral movement of the anvil, and a cooperating anvil carried by the base in alignment with the first anvil and having at least one ridge means between which anvils a test part is received in gaging position.

6. A gage as in claim 5 in which the shaft is mounted for both pivotal and axial movement.

7. A gage as in claim 5 in which the means mounting the first anvil upon the shaft is a pivot means extending at right angles to the axis of the shaft and an indicator carried by the shaft having a contactor engaging the first anvil spaced from the pivot and controlled by pivotal movement thereof.

8. A gage for testing a test part such as a turbine blade wedge having locking means comprising a base, a first anvil having at least one straight ridge means for engagement of a substantial length of locking means in one face of a wedge, a shaft mounted on the base having a first axle extending at right angles to the ridge means and having pivotal movement upon the first axis and axial movement, an indicator carried by the base for each movement of the shaft, pivot means carried by the shaft mounting the first anvil thereon for pivotal movement on a second axis at right angles to the first axis and extending laterally with respect to the ridge means and for axial movement on the pivot means, an indicator carried by the shaft having a contactor engaging the anvil spaced from the pivot means for indicating pivotal movement of the anvil, an indicator carried by the shaft having a contactor engaging the anvil to be controlled by the said lateral movement of the anvil, and a cooperating anvil carried by the base in alignment with the first anvil and having at least one ridge means between which anvil a test part is received in gaging position.

9. A gage for testing a test part such as a turbine blade wedge having locking means comprising a base, a first anvil having at least one straight ridge means for engagement of a substantial length of the locking means on one face of a wedge, means carried on the base for mounting the anvil for at least one of four movements including pivotal movement upon a first axis extending at right angles to the ridge means and axial movement upon this axis and pivotal movement on a second axis extending at right angles to the first axis and also extending laterally with respect to the ridge means and for lateral movement at right angles to the first axis and laterally with respect to its ridge means, an indicator for each movement and controlled by the movement, a cooperating anvil having at least two spaced ridge means at least one of which is of substantial length and straight between which anvils a test part is received in gaging position, and means carried by the base mounting the cooperating anvil in alignment with the first anvil and for free movement pivotally on an axis parallel with the ridge means, and an indicator carried by the base and engaging the cooperating anvil to indicate the pivoting thereof.

10. A gage for testing a test part such as a turbine blade wedge having locking means comprising a base, a first anvil having at least one straight ridge means for engagement of a substantial length of the locking means on one face of a wedge, means carried on the base for mounting the anvil for at least one of four movements including pivotal movement upon a first axis extending at right angles to the ridge means and axial movement upon this axis and pivotal movement on a second axis extending at right angles to the first axis and also extending laterally with respect to the ridge means and for lateral movement at right angles to the first axis and laterally with respect to its ridge means, an indicator for each movement and controlled by the movement, a cooperating anvil carried by the base in alignment with the first anvil and having at least one ridge means between which anvils a test part is received in gaging position, lead testing means mounted on the cooperating anvil for rotation on an axis extending laterally with respect to the ridge means and for axial movement including a plurality of ridge means spaced peripherally with respect to each other and spaced axially with respect to each other, and an indicator carried by the base and indicating the axial movement of the lead testing means.

11. A gage for testing a test part such as a turbine blade wedge having locking means comprising a base, a first anvil having at least one straight ridge means for engagement of a substantial length of the locking means on one face of a wedge, means carried on the base for mounting the anvil for at least one of four movements including pivotal movement upon a first axis extending at right angles to the ridge means and axial movement upon this axis and pivotal movement on a second axis extending at right angles to the first axis and also extending laterally with respect to the ridge means and for lateral movement at right angles to the first axis and laterally with respect to its ridge means, an indicator for each movement and controlled by the movement, a cooperating anvil having at least one straight ridge means between which anvils a test part is received in gaging position, pivot means carried by the base mounting the cooperating anvil in alignment with the first anvil and for movement pivotally on an axis parallel to the ridge means, an indicator carried by the base and engaging the cooperating anvil to indicate the pivoting thereof, lead testing means mounted on the cooperating anvil for rotation on an axis extending laterally with respect to the ridge means and for axial movement including a plurality of ridge means spaced peripherally with respect to each other and spaced axially with respect to each other and corresponding to the locking means, and an indicator carried by the anvil and indicating the axial movement of the lead testing means.

12. A gage for testing a test part such as a turbine blade wedge having locking means comprising a base, a first anvil and a cooperating anvil, the first anvil having at least one straight ridge means for engagement of a substantial length of the locking means on one face of a wedge, means carried on the base for mounting the anvil for movement in a direction at right angles to the ridge means towards and away from a cooperating anvil, an indicator carried by the base and controlled by the movement of the mounting means, the cooperating anvil having at least one straight ridge means between which anvils a test part is received in gaging position, pivot means carried by the base mounting the cooperating anvil in alignment with the first anvil and for movement pivotally on an axis parallel to the ridge means of the cooperating anvil, an indicator carried by the base and engaging the cooperating anvil to indicate the pivoting thereof, lead testing means mounted on the cooperating anvil for rotation on an axis extending laterally with respect to the ridge means and for axial movement including a plurality of ridge means spaced peripherally with respect to each other and spaced axially with respect to each other and corresponding to the locking means, and an indicator carried by the anvil and indicating the axial movement of the lead testing means.

13. A gage for testing a test part such as a turbine blade wedge having locking means comprising a base, a first anvil, and a cooperating anvil, the first anvil having at least one straight ridge means for engagement of a substantial length of the locking means on one face of a wedge, means carried on the base for mounting the anvil for pivotal movement upon a first axis extending at right angles to the ridge means and axial movement upon the axis towards and from a cooperating anvil, an indicator carried by the base for each movement and controlled by the movement, the cooperating anvil having at least two ridge means between which anvils a test part is received in gaging position, pivot means carried by the base mounting the cooperating anvil in alignment with the first anvil and for movement pivotally on an axis parallel to the ridge means of the cooperating anvil, and an indicator carried by the base and engaging the cooperating anvil to indicate the pivoting thereof.

14. A gage as in claim 13 including lead testing means mounted on the cooperating anvil for rotation on an axis extending laterally with respect to the ridge means and for axial movement including a plurality of ridge means spaced peripherally with respect to each other and spaced axially with respect to each other corresponding to the locking means, and an indicator carried by the anvil and indicating the axial movement of the lead testing means.

15. A gage for testing a test part such as a turbine blade wedge having locking means comprising a base, a first anvil and a cooperating anvil, the first anvil having at least one straight ridge means for engagement of the locking means on one face of a wedge, means carried on the base for mounting the anvil for movement at right angles to the ridge means towards and from a cooperating anvil, an indicator carried by the base for said movement, pivot means carried by the aforesaid means for pivotal movement on an axis extending at right angles to the aforesaid movement and also extending laterally with respect to the ridge means, an indicator carried by the mounting means for said movement and controlled by the movment, the cooperating anvil having at least two straight ridge means between which anvil having at least two straight ridge means between which anvils a test part is received in gaging position, means carried by the base mounting the cooperating anvil in alignment with the first anvil and for movement pivotally on an axis parallel to the ridge means, and an indicator carried by the base and engaging the cooperating anvil to indicate the pivoting thereof.

16. A gage as in claim 15 including lead testing means mounted on the cooperating anvil for rotation on an axis extending laterally with respect to the ridge means and for axial movement including a plurality of ridge means spaced peripherally with respect to each other and spaced axially with respect to each other corresponding to the locking means, and an indicator carried by the anvil and indicating the axial movement of the lead testing means.

17. A gage for testing a test part such as a turbine blade wedge having locking means comprising a base, a first anvil and a cooperating anvil, the first anvil having at least one straight ridge means for engagement of a substantial length of the locking means on one face of a wedge, a first means carried on the base for mounting the anvil for movement towards and away from a cooperating anvil, an indicator carried by the base and controlled by said movement, means carried by the aforesaid means mounting the anvil for lateral movement at right angles to the aforesaid movement and laterally with respect to its ridge means, an indicator carried by the first mounting means and controlled by the lateral movement of the anvil, the cooperating anvil having at least two straight ridge means between which anvils a test part is received in gaging position, means carried by the base mounting the cooperating anvil in alignment with the first anvil and for movement pivotally on an axis parallel to the ridge means of the cooperating anvil, and an indicator carried by the base and engaging the cooperating anvil to indicate the pivoting thereof.

18. A gage as in claim 17 including lead testing means mounted on the cooperating anvil for rotation on an axis extending laterally with respect to the ridge means and for axial movement including a plurality of ridge means spaced peripherally with respect to each other and spaced axially with respect to each other, and an indicator carried by the anvil and indicating the axial movement of the lead testing means.

19. A gage for testing a test part such as a turbine blade wedge having locking means comprising a base, a first anvil having at least one ridge means for engagement of the locking means on one face of the wedge, a first means carried on the base for mounting the anvil for pivotal movement upon a first axis extending at right angles to the ridge means and for axial movement upon this axis, an indicator for each movement and controlled thereby, a second means carried by the first mounting means mounting the anvil for pivotal movement on a second axis extending at right angles to the first axis and also extending laterally with respect to the ridge means, an indicator carried by the first mounting means and controlled by the pivotal movement of the anvil on the second axis, a cooperating anvil having at least two straight ridge means between which anvils a test part is received in gaging position, means carried by the base mounting the cooperating anvil in alignment with the first anvil and for movement pivotally on an axis parallel to the ridge means, and an indicator carried by the base and engaging the cooperating anvil to indicate the pivoting thereof.

20. A gage as in claim 19 including lead testing means mounted on the cooperating anvil for rotation on an axis extending laterally with respect to the ridge means and for axial movement including a plurality of ridge means spaced peripherally with respect to each other and spaced axially with respect to each other, and an indicator carried by the anvil and indicating the axial movement of the lead testing means.

21. A gage for testing a test part such as a turbine blade wedge having locking means comprising a base, a first anvil having at least one straight ridge means for engagement of a substantial length of the locking means on one face of a wedge, a first means carried on the base for mounting the anvil for pivotal movement upon a first axis extending at right angles to the ridge means and axial movement upon this axis, an indicator carried by the base for each movement and controlled thereby, a second means carried by the first means mounting the anvil for pivotal movement on a second axis extending at right angles to the first axis and also extending laterally with respect to the ridge means for lateral movement at right angles to the first axis and laterally with respect to its ridge means, an indicator carried by the first mounting means for each movement with respect to the second mounting means and controlled by the movement, a cooperating anvil having at least two straight ridge means between which anvils a test part is received in gaging position, means carried by the base mounting the cooperating anvil in alignment with the first anvil and for movement pivotally on an axis parallel to the ridge means of the cooperating anvil, and an indicator carried by the base and engaging the cooperating anvil to indicate the pivoting thereof.

22. A gage as in claim 21 including lead testing means mounted on the cooperating anvil for rotation on an axis extending laterally with respect to the ridge means and for axial movement including a plurality of ridge means spaced peripherally with respect to each other and spaced axially with respect to each other, and an indicator carried by the base and indicating the axial movement of the lead testing means.

23. A gage for testing a test part such as a turbine blade wedge having locking means comprising a base, a first anvil having at least one straight ridge means for engagement of a substantial length of the locking means on one face of a wedge, mounting mechanism for mounting the first anvil on the base including means mounting the anvil for at least one of two movements including pivotal movement upon an axis extending at right angles to the ridge means for angular movement of its ridge means in a first plane and axial movement upon this axis; a cooperating anvil having at least two spaced ridge means at least one of which is straight and of substantial length between which anvils a test part is received in gaging position, the mounting mechanism including means mounting the first anvil for pivotal movement in a plane at right angles to the first plane on a second axis extending laterally at right angles with respect to its ridge means and for lateral movement in the direction of the second axis towards and away from alignment with the cooperating anvil, and an indicator carried by the mounting means for the first anvil, and means carried by the base mounting the cooperating anvil in alignment with the first anvil and for free movement pivotally on an axis parallel with the ridge means, and an indicator carried by the base and engaging the cooperating anvil to indicate the pivoting thereof.

References Cited in the file of this patent
UNITED STATES PATENTS

| | | |
|---|---|---|
| 1,939,643 | Beardsley | Dec. 19, 1933 |
| 2,367,004 | Chitwood | Jan. 9, 1945 |
| 2,445,402 | Malmberg | July 20, 1948 |
| 2,487,677 | Steczynski | Nov. 8, 1949 |
| 2,563,910 | Bean | Aug. 14, 1951 |
| 2,623,295 | Orlandi | Dec. 30, 1952 |